United States Patent Office 2,703,777
Patented Mar. 8, 1955

2,703,777

OPHTHALMOLOGICAL PREPARATIONS AND VEHICLES AND METHOD OF MAKING THE SAME

Robert Robin Feinstein, Brooklyn, and Arthur William Bechtold, Forest Hills, N. Y., assignors to The Iso-Sol Company, Inc., Brooklyn, N. Y., a corporation of New York No Drawing. Application May 2, 1950,
Serial No. 159,654

10 Claims. (Cl. 167—59)

The present invention relates to therapeutic ophthalmic preparations and more particularly to viscous, buffered, isotonic, medicated ophthalmic molecular solutions or dispersions in the nature of gels and the vehicles from which the same are produced.

It has been found that ordinary ointments and liquid preparations for ophthalmological use are not particularly satisfactory or effective and that they are, moreover, inconvenient to apply. In many cases the ointments contain ingredients which make them bulky for the relatively limited amount of medication which can be carried thereby and also involve the introduction of ingredients which themselves are of no utility or which may even be somewhat disadvantageous. Ointments are, moreover, excessively viscous almost to the point of solidity and release the active medication only very slowly and over an inordinately long period of time; on the other hand, the liquid preparations go to the other extreme and run off or dissipate too rapidly. So far as we are aware, there is no ophthalmological preparation known or available which overcomes these difficulties and which makes it possible to effect treatment of the eye in a highly effective manner with avoidance both of the ointment and the liquid physical state.

One of the objects of the present invention is, therefore, to provide medicated ophthalmological preparations in the form of gels which overcome the above noted and other difficulties and disadvantages of prior preparations and which are characterized by unique and highly valuable properties of their own.

Another object of our invention is to provide medicated ophthalmological gel-like preparations which can be given a predetermined, desired pH value and in which the pH value can be altered as required.

A still further object of the invention resides in the vehicles from which the ultimate preparations are produced and also in the methods involved in the preparation of the same.

Other and still further objects and advantages will be understood and appreciated by those skilled in this art or will be apparent or pointed out hereinafter.

Our invention is predicated upon the discovery that ordinary solutions and mechanical dispersions are unsatisfactory for ophthalmological uses and that unique and highly valuable ophthalmological preparations are produced by molecular dispersions of water-soluble drugs in vehicles to produce gels, as will hereinafter be more fully explained. Therefore, our new products are to be distinguished at the outset from conventional solutions and dispersions and from ointments and ungents which have been found by us to be incapable of producing the present results.

We have found further that it is essential to follow certain procedure or a certain order of steps in order to produce our new products and that the best results cannot be attained by any mere admixing procedure with respect to the ingredients involved.

In preparing our new vehicles and final products, we first make up a buffer system composed of boric acid and potassium chloride. These components are utilized in such amounts that they respectively constitute approximately 1.24% and 0.74% of the ultimate product. An aqueous solution of sodium carbonate (2.2%) is added to the boric acid and potassium chloride components. The percentages referred to are by weight. The pH value of the boric acid and potassium chloride components is approximately 5, which is therefore slightly on the acid side, prior to the incorporation of the aqueous sodium carbonate thereinto, the exact amount of which can be varied and which in each case is such as to raise the pH value to that which is desired or necessary depending upon the particular drug or medicament subsequently added. As is well-known, different drugs are affected considerably by pH conditions especially with respect to stability and medicinal effect and our invention therefore contemplates the selection of the optimum pH conditions for each particular drug, and this is simply accomplished by altering the percentage or concentration of the aqueous sodium carbonate solution employed.

After the boric acid, potassium chloride and sodium carbonate components are prepared in accordance with the foregoing, a solution results to which the active drug is then added. This drug may be any one or more of a variety of drugs as will be hereinafter mentioned, but it is to be understood that the active ingredient may be any substance which is useful in ophthalmological treatments and, moreover, that the amount of each such drug is in accordance with known professional practices—i. e., as to character and amount known to the medical profession and particularly that specialized field of medicine relating to treatment of the eye. Examples of suitable drugs for ophthalmological purposes are referred to hereinafter.

The next step is to add a humectant. We have found that this is important because it prevents the drying out of the preparations or vehicles and also ensures that the products shall have their maximal effectiveness. We have found that glycerine is an entirely satisfactory humectant but it is to be understood that other humectants such as sorbitol or propylene glycol may equally well be employed. The proportion of humectant is within the range of 5–15% based upon the final preparations.

We next incorporate into the preparations, which have reached the stage just referred to above, an amount of methyl cellulose within the range of approximately 3–5% based upon the final product. This amount of methyl cellulose is, however, used where we do not also employ a bodying agent in addition and, when such a bodying agent is included in the composition, we have found that it is only then necessary to utilize about 1½–2% of methyl cellulose. As a bodying agent we preferably employ one of the polyethylene glycols manufactured and sold by Carbide & Carbon Chemical Corporation under that name or under the trade-mark of Carbowax and, in this connection, we have found that we may employ polyethylene glycols 200, 300, 400 and 600 and Carbowax 6,000 or equivalent amounts of Carbowax 1,000, 1,500, 1,540, 4,000 and 10,000 (also known as PF–45), it being noted that the Carbowaxes are polymerized, polyethylene glycols and that the numbers are the approximate molecular weights of the polymers involved. The amount of Carbowax 6,000 which we use ranges from approximately 0.75%–3% based upon the final product. The amounts of the other Carbowaxes are equivalent and can be readily calculated. However, the amount of bodying agent may vary considerably and, therefore, our invention contemplates the use of an amount of bodying agent which ranges from 1–20%, the preferred amount being about 10%. The bodying agent produces and maintains a high viscosity for the vehicles and preparations which is materially below that involved in ointments or unguents but which is markedly above that involved by conventional liquid preparations. The preparations of intermediate viscosity are gels or of gel-like consistency.

After the compositions are produced as above described, they are kept relatively cold at a reduced temperature. This not only effects a desirable aging action upon the compositions but ensures optimum clarity and assimilation and distribution of the methyl cellulose. For best results we have found that the preparations should be kept at a temperature of approximately 0° C. for a period of about 24 hours but this particular temperature and time relationship can be somewhat varied without adversely affecting the preparations.

We also incorporate into the preparations a bactericidal and/or fungicidal component such as benzalkonium chloride, which is a quaternary ammonium compound (an alkyl dimethyl benzyl ammonium chloride) such as that sold under the name of Zephiran or Cetyl Zephiran, or other antiseptic substances such as phenylmercuric salts—i. e., the nitrate, Merthiolate, etc.—which are known to have satisfactory, cold sterilizing properties and which are non-injurious in use. Furthermore, we may, and preferably do, carry out the foregoing procedure under bactericidal lamps known as Sterilamps and, in any event, carry out the preparation and packaging of the preparations under sterile conditions. It is to be noted that the present products are not susceptible of ordinary sterilization by means of high temperatures since the latter would be destructive.

The preparations are then filled into suitable containers such as sterile tubes, ampules, syringes and other suitable or professionally acceptable containers and are ready for use.

We have pointed out above that the preparations are isotonic and that the pH may be varied, and examples illustrating the invention are set forth below with especial reference to pH values, active drugs and percentages thereof most commonly employed.

pH 5.0

Eserine salicylate vehicle___ .125%, .25%, .50%.
Eserine salicylate in combination with pilocarpine___ The combined percentages of the individual components.

pH 6.0

| | |
|---|---|
| Alum | .2% |
| Cocaine | .25%–4% |
| Epinephrine | 1:1000 to 1:5000 |
| Procaine hydrochloride | 1% |
| Dionin | 1–5% |
| Zinc salts (zinc chloride or zinc sulfate) | .125%, .25%, .50% |
| Metycaine | 2%, 4% | pH 6.5

| | |
|---|---|
| Euphthalmine or eucatropine | 1–10%—e. g., 5%, 10% | pH 7.0

| | |
|---|---|
| Sodium propionate | 5%, 10% | pH 7.6

| | |
|---|---|
| Atropine salts (sulphate) | .25%–3% |
| Homatropine salts (hydrobromide) | 1–5% |
| Pilocarpine salts | 1, 2, 3, 4% |
| Scopolamine salts (hyoscyamine) | .1–.5% |

The pH 6.0 preparations are also generally employed whenever zinc salts are present or any combination of zinc salts with other drugs. For example, we have prepared and successfully used a composion, each 28 cc. of which contains .060 gram of zinc sulfate and .200 gram of Isocaine [Gamma (2-methyl piperidino) propyl benzoate HCl] also known as Piperocaine hydrochloride USP XIV.

Under other conditions where there is a combination of drugs, we have found that a pH of 7.0 is generally to be preferred.

For the above preparations we have found that a viscosity of 4,000 centipoises is entirely satisfactory and is to be preferred, but it is to be understood that different viscosity values are obtained for different concentrations. For example, a 1½% methyl cellulose preparation has a viscosity of 1,000 centipoises; a 2% preparation has a viscosity of 4,000 centipoises; a 2½% preparation has a viscosity of 10,000 centipoises and a 3% preparation has a viscosity of 25,000 centipoises. Intermediate concentrations have corresponding intermediate viscosity values.

Preparations responding to our invention have maximum stability, activity and comfort in use in the eye. Certain of them are mildly astringent and anaesthetic. They are all antiseptic, aqueous, buffered, isotonic compositions or preparations. They are bland and non-irritating and, being isotonic, differences in osmotic pressures between the preparation and the tissue are avoided. Stinging and burning are completely or substantially completely absent. The preparations are non-toxic and well tolerated and, in this connection, it has been found that patients are not ordinarily sensitive thereto.

Vehicles as described herein not only have no medicinal action themselves but do not interfere with the action of drugs added thereto and which when so added produce anesthesia, antisepsis, mydriasis, miosis and other effects known to ophthalmologists. Our new preparations are useful, for example, in treating conjunctivitis (Morax-Axenfeld or Vernal), itching and swelling, for controlling infection and irritation and for general ophthalmological uses. They have general soothing and emollient effects and have also been found to be particularly advantageous after removal of foreign bodies from the eye or conjunctiva.

The foregoing is presented as exemplary or illustrative and not as limitative or restrictive since other and further variations may be made without departing from the scope or spirit of the invention as defined by the appended claims.

We claim:

1. A vehicle for a gel-like, water soluble ophthalmological preparation comprising water, a buffer system comprising a pH control agent, a humectant and methyl cellulose, together with a polyethylene glycol having a molecular weight between about 200 and 10,000 as a bodying agent to produce and maintain a viscosity of 1000–25,000 centipoises.

2. The method of preparing an ophthalmological preparation of the character described which comprises the steps of preparing an aqueous buffer system of boric acid and potassium chloride, adding aqueous sodium carbonate solution thereto to raise the pH of the buffer system to a pre-selected value related to an active drug for ophthalmological treatment and thereafter introducing such active drug for which the particular pH value was intended, adding a humectant selected from the group consisting of glycerine, sorbitol and propylene glycol, introducing a small quantity of methyl cellulose, less than about 2% of the weight of the final produce adding polyethylene glycol of molecular weight between 200 and 10,000 in a quantity sufficient to make a gel having a viscosity between about 1,00 and 25,000 cp., and aging the resulting preparation at about 0° C. for a period of time of about 24 hours, the said steps being carried out under bacteriologically sterile conditions.

3. The method defined in claim 2 in which a polyethylene glycol bodying agent is introduced after the addition of the humectant and before aging.

4. An isotonic ophthalmic medicament consisting essentially of a gel containing a water soluble buffered drug system having a pH in the range about pH5 and pH7.6, 5–15% of a humectant, about 1–20% of polyethylene glycol having a mol. wt. between about 200 and 10,000, water, and sufficient methyl cellulose to produce a viscosity between about 1000 and 25,000 cp.

5. An isotonic, gel-like ophthalmic medicament consisting essentially of a water soluble buffer system including a mild base, a mild acid and an ophthalmically neutral salt, a medicament of water soluble type, a humectant, not over about 2% of methyl cellulose, and about 1–20% of polyethylene glycol having a mol. wt. between about 200 and 10,000, and water, the methyl cellulose and polyethylene glycol being in proportions producing a viscosity between about 1,000 and 25,000 centipoises.

6. The method of making a gel-like isotonic, buffered, water soluble ophthalmic medicament that, in the order stated, comprises the steps of forming a water solution of an ophthalmic drug and mixing enough thereof with an aqueous buffer solution to provide medicinal effect, to maintain the isotonic nature of the system, and to produce a pH in the range about 5 to 7.6, adding to said isotonic system a humectant, adding to said system not over about 2% of methyl cellulose, and an amount of polyethylene glycol having a mol. wt. between 200 and 10,000 sufficient to produce a gel having a viscosity between 1,000 and 25,000 cp., and aging the medicament at circa 0° C. for about 24 hours.

7. The method of making a gel-like isotonic, buffered, ophthalmic medicament that comprises forming a buffer solution consisting of water, a mild acid, a mild base, and an ophthalmically neutral salt in proportions forming an isotonic solution, adding thereto a water solution of an ophthalmic drug in sufficient quantity to bring the pH into the range between about pH 5 and about pH 7.6 and to maintain the isotonic nature of the solution, adding 5–15% of a humectant, and forming the gel by adding thereto methyl cellulose, and polyethylene glycol having a mol. wt. in the range about 200 and 10,000, in quantity sufficient to produce a viscosity between about 1,000 and 25,000 centipoises, and aging the gel at circa 0° C.

8. The method of making a gel-like isotonic, buffered, ophthalmic medicament that comprises forming a buffer solution comprising water, boric acid, potassium chloride, and sodium carbonate in proportions forming an isotonic solution, adding thereto a water solution of an ophthalmic drug in sufficient quantity to produce a pH in the range between about pH 5 and about pH 7.6 and to maintain the isotonic nature of the solution, adding 5–15% of a humectant, and forming a gel by adding thereto methyl cellulose in a quantity circa 1½–5% and if the methyl cellulose is present in the range about 1½–2% adding polyethylene glycol having a mol. wt. in the range between about 200 and 10,000, in quantity sufficient to produce a viscosity between about 1,000 and 25,000 centipoises, and aging the gel at circa 0° C. for about 24 hours.

9. The method of making a gel-like isotonic, buffered, ophthalmic medicament that comprises forming a buffer solution consisting of water, a mild acid, a mild base, and an ophthalmically neutral salt of the type of sodium carbonate in proportions forming an isotonic solution, adding thereto a water solution of an ophthalmic drug in sufficient quantity to bring the pH into the range between about pH 5 and about pH 7.6 and to maintain the isotonic nature of the solution, adding 5–15% of a humectant of the type of glycerine, sorbitol and propylene glycol, and forming a gel by adding thereto methyl cellulose in a quantity circa 1½–5% and if the methyl cellulose is present in the range below 2% adding polyethylene glycol having a mol. wt. in the range between about 200 and 10,000, in quantity sufficient to produce a viscosity between about 1,000 and 25,000 centipoises, and aging the gel at circa 0° C. for about 24 hours.

10. The method of making a gel-like isotonic, buffered ophthalmic medicament that in the order stated, comprises the steps of making a system consisting of boric acid and potassium chloride in water in the respective amounts of about 1.2 and .7% of the weight of the solution, making a water solution of sodium carbonate and adding enough thereof to the said system to introduce about 2.2% of $Na_2CO_3$ based on the weight of the solution, thus forming a buffer system, forming a water solution of an ophthalmic drug and adding enough thereof to the buffer solution to provide medicinal effect and maintain the isotonic nature of the system, adding to said isotonic system about 5–15% of a humectant, adding to said system polyethylene glycol having a mol. wt. between 200 and 10,000 and methyl cellulose in sufficient quantity to produce a gel having a viscosity between 1,000 and 25,000 cp., the methyl cellulose being present in not over 2%, and aging the medicament at circa 0° C. for about 24 hours.

References Cited in the file of this patent

UNITED STATES PATENTS

| | | |
|---|---|---|
| 2,445,366 | Rigby | July 20, 1948 |
| 2,484,035 | Johnson | Oct. 11, 1949 |
| 2,550,622 | Taub | Apr. 24, 1951 |

OTHER REFERENCES

Carbowax Pamphlet, Carbide and Carbon Chemicals Corp., June 30, 1946, pp. 3–9.

Brecht, The Merck Report, October 1945, pp. 27–30.

Brecht, The Merck Report, January 1945, pp. 15–19.

Albaugh, Am. Prof. Pharm., March 1946, pp. 257–8.

Swan—Arch. Ophthalmology, vol. 33 (1945), pp. 378–380.

Drug Cosmetic Industry, July 1947, p. 101.

Obrig Arch. Ophthalmology, November 1947, pp. 668, 674–676.